(12) United States Patent
Abe

(10) Patent No.: US 7,660,446 B2
(45) Date of Patent: Feb. 9, 2010

(54) DIGITAL-SIGNAL PROCESSING APPARATUS, DIGITAL-SIGNAL PROCESSING METHOD, PROGRAM, AND AUTHENTICATION APPARATUS

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 729 days.

(21) Appl. No.: 11/247,820

(22) Filed: Oct. 11, 2005

(65) Prior Publication Data

US 2006/0095491 A1    May 4, 2006

(30) Foreign Application Priority Data

Oct. 29, 2004    (JP)    ............ P2004-316674

(51) Int. Cl.
*G06F 17/14* (2006.01)
(52) U.S. Cl. ............................. 382/124; 708/400
(58) Field of Classification Search .......... 382/124; 708/400
See application file for complete search history.

(56) References Cited

U.S. PATENT DOCUMENTS 4,156,920 A * 5/1979 Winograd ............... 708/405
4,604,721 A * 8/1986 Gray .................... 708/405
7,028,064 B2 * 4/2006 Buchert et al. ............ 708/405
2004/0120556 A1 * 6/2004 Kono et al. .............. 382/124

OTHER PUBLICATIONS

Cooley and Tukey, "An Algorithm for the Machine Calculation of Complex Fourier Series" Mathemetics of Computation, vol. 19, pp. 297-301, Apr. 1965.*
Kolba et al., "A Prime Factor FFT Algorithm Using High-Speed Convolution" IEEE Transactions on Acoustics, Speech, and Signal Processing, vol. ASSP-25, No. 4., pp. 281-294, Aug. 1977.*
Cochran et al. "What Is the Fast Fourier Transform?" Proceedings of the IEEE, vol. 55, No. 10, pp. 1664-1674, Oct. 1967.*

* cited by examiner

*Primary Examiner*—Charles Kim
*Assistant Examiner*—Stephen R Koziol
(74) *Attorney, Agent, or Firm*—Sonnenschein Nath & Rosenthal LLP

(57) ABSTRACT

A digital-signal processing apparatus in which the efficiency of processing data can be prevented uniformly. The apparatus includes: an extracting unit that extracts a part of real data input; a selecting unit that selects a data size from similar data sizes falling in a range, in accordance with the size of the extracted data, which is a reference value, and with data-decomposing conditions described in an algorithm that realizes fast Fourier transform; and an operation unit that decomposes the data extracted and having the selected size into data items, in accordance with the data-decomposing conditions, and that performs Fourier transform on each data item, thereby effecting convolution on the data item.

8 Claims, 15 Drawing Sheets

DIGITAL-SIGNAL PROCESSING APPARATUS, DIGITAL-SIGNAL PROCESSING METHOD, PROGRAM, AND AUTHENTICATION APPARATUS

CROSS REFERENCE TO RELATED APPLICATIONS

The present invention contains subject matter related to Japanese Patent Application JP2004-316674 filed in Japanese Patent Office on Oct. 29, 2004, the entire contents of which being incorporated herein by reference.

BACKGROUND OF THE INVENTION

1. Field of the Invention

The present invention relates to a digital-signal processing apparatus, a digital-signal processing method, a program, and an authentication apparatus. The invention is suitable for performing, for example, fast Fourier transform (FFT).

2. Description of the Related Art

Fast Fourier transform (hereinafter called FFT) is an algorithm that employs bit inversion or butterfly operation, as well as complex multiplication, thereby increasing the speed of discrete Fourier transform (DFT).

To perform discrete Fourier transform on, for example, n data items, complex multiplication must be carried out $n^2$ times in most cases. If fast Fourier transform is performed on the same number of items, it suffices to perform complex multiplication only n $\log_2$n times. The reduction in the number of times the complex multiplication is repeated results in a tremendous decrease in time required. A computer that can make $10^9$ operations per second requires 30 years to perform discrete Fourier transform on $2^{30}$ data items. It requires only three minutes to perform fast Fourier transform on $2^{30}$ data items.

FFT can thus remarkably reduce the amount of data that should be processed to perform the discrete Fourier transform. The greater the number of data items subjected to operation, the more prominent the advantage of FFT.

Discrete Fourier transform can realize convolution in the Fourier space. This is because the result of convolution of two functions f(x) and g(x) is equal to the product of the functions f(x) and g(x) that have been subjected to the discrete Fourier transform. In practice, the functions f(x) and g(x) are first subjected to discrete Fourier transform, and the product of the functions thus operated is then subjected to inverse discrete Fourier transform. The result of the convolution is thereby obtained.

Accordingly, FFT is generally employed in various types of data processing. It is applied to, for example, the process of determining data components (frequency-component analysis), the process of synthesizing given components of specific data (waveform synthesis), and the process of extracting desired components from data (digital filtering). (See PCT National Publication No. 2003-509748.)

SUMMARY OF THE INVENTION

Two algorithms that implement FFT are generally known. They are the Cooly-Tukey type and the prime factor type. The Cooly-Tukey type FFT uses a calculation that can efficiently shorten the time of the discrete Fourier transform if the data is of such a size as can be decomposed into 2's powers. By contrast, the prime factor type FFT can efficiently shorten the time of the discrete Fourier transform if the data is of such a size as can be decomposed into products of small prime numbers.

Thus, these two types of FFT are identical in that the data must be divided into parts, though they differ in the condition of dividing the data in order to perform the discrete Fourier transform at high efficiency.

Assume that a part of certain data is extracted and then subjected to FFT. This part of data does not always satisfy the condition of dividing the data for FFT. The efficiency of FFT may greatly decrease, depending on the type of the data from which the part has been extracted.

The present invention has been made in view of the foregoing. An object of the invention is to provide a digital-signal processing apparatus, a digital-signal processing method and a program, which are able to prevent a decrease in data-processing efficiency. Another object of the invention is to provide an authentication apparatus that can help to increase data-processing efficiency.

To achieve the object, a digital-signal processing apparatus according to this invention comprises: an extracting means for extracting a part of real data input; a selecting means for selecting a data size from similar data sizes falling in a range, in accordance with the size of the extracted data, which is a reference value, and with data-decomposing conditions described in an algorithm that realizes the fast Fourier transform; and an operation means for decomposing the data extracted and having the selected size into data items, in accordance with the data-decomposing conditions, and for performing Fourier transform on each data item, thereby effecting convolution on the data item.

In the digital-signal processing apparatus, even if data of a size not satisfying data-decomposing conditions is extracted, a data size that satisfies the data-decomposing conditions is automatically selected from the data sizes similar to that of the data extracted. This can prevent a decrease in the efficiency of convolution, and can yet maintain the data size at a value similar to the initial data size, regardless of the size of the data extracted.

A digital-signal processing method according to this invention comprises: a first step of extracting a part of real data input; a second step of selecting a data size from similar data sizes falling in a range, in accordance with the size of the extracted data, which is a reference value, and with data-decomposing conditions described in an algorithm that realizes the fast Fourier transform; and a third step of decomposing the data extracted and having the selected size into data items, in accordance with the data-decomposing conditions, and for performing Fourier transform on each data item, thereby effecting convolution on the data item.

In the digital-signal processing method, even if data of a size not satisfying data-decomposing conditions is extracted, a data size that satisfies the data-decomposing conditions is automatically selected from the data sizes similar to that of the data extracted. This can prevent a decrease in the efficiency of convolution, and can yet maintain the data size at a value similar to the initial data size, regardless of the size of the data extracted.

A program according to this invention can cause a control apparatus to perform: a first step of extracting a part of real data input; a second step of selecting a data size from similar data sizes falling in a range, in accordance with the size of the extracted data, which is a reference value, and with data-decomposing conditions described in an algorithm that realizes the fast Fourier transform; and a third step of decomposing the data extracted and having the selected size into data items, in accordance with the data-decomposing conditions, and for performing Fourier transform on each data item, thereby effecting convolution on the data item.

When this program is used, even if data having a size not satisfying data-decomposing conditions is extracted, a data size that satisfies the data-decomposing conditions is automatically selected from the data sizes similar to that of the data extracted. This can prevent a decrease in the efficiency of convolution, and can yet maintain the data size at a value similar to the initial data size, regardless of the size of the data extracted.

An authentication apparatus according to the present invention comprises: an extracting means for extracting image a part of image data acquired by photographing a living subject, which represents an image with which the living subject is identified to be authenticated; a selecting means for selecting a data size from similar data sizes falling in a range, in accordance with the size of the extracted image data, which is a reference value, and with data-decomposing conditions described in an algorithm that realizes fast Fourier transform; an operation means for decomposing the image data extracted and having the selected size into data items, in accordance with the data-decomposing conditions, and for performing Fourier transform on each data item, thereby effecting convolution on the data item; and a correlation means for correlating a result of the convolution with a data item.

In the authentication apparatus, even if image data having a size not satisfying data-decomposing conditions is extracted, a data size that satisfies the data-decomposing conditions is automatically selected from the data sizes similar to that of the image data extracted. This can prevent a decrease in the efficiency of convolution, and can yet maintain the data size at a value similar to the initial data size, regardless of the size of the image data extracted. In addition, the amount of data that should be processed to achieve the correlation after the convolution can be much reduced.

In the present invention, a part of real data input is extracted, a data size is selected from similar data sizes falling in a range in accordance with the size of the extracted data, which is a reference value, and with data-decomposing conditions described in an algorithm that realizes the fast Fourier transform, and the data extracted and having the selected size is decomposed into data items, in accordance with the data-decomposing conditions, and Fourier transform on each data item is performed, thereby effecting convolution on the data item. Thus, the efficiency of convolution can be prevented from decreasing, while maintaining the data size at a value similar to the initial data size, regardless of the size of the data extracted. Decrease of the data-processing efficiency can be prevented uniformly.

In the present invention, a part of image data acquired by photographing a living subject is extracted, which represents an image with which the living subject is identified to be authenticated. A data size is selected from similar data sizes falling in a range, in accordance with the size of the extracted image data, which is a reference value, and with data-decomposing conditions described in an algorithm that realizes fast Fourier transform. The image data extracted and having the selected size is decomposed into data items, in accordance with the data-decomposing conditions. Fourier transform is performed on each data item, thereby effecting convolution on the data item. The result of the convolution is correlated with a data item. This can prevent a decrease in the efficiency of convolution, and can yet maintain the data size at a value similar to the initial data size, regardless of the size of the image data. In addition, the amount of data that should be processed to achieve the correlation after the convolution can be much reduced.

The nature, principle and utility of the invention will become more apparent from the following detailed description when read in conjunction with the accompanying drawings in which like parts are designate dby like reference numerals or characters.

DETAILED DESCRIPTION OF THE PREFERRED EMBODIMENTS

An embodiment of the present invention will be described, with reference to the accompanying drawings.

(1) Configuration of the Authentication Apparatus

Figure 1:
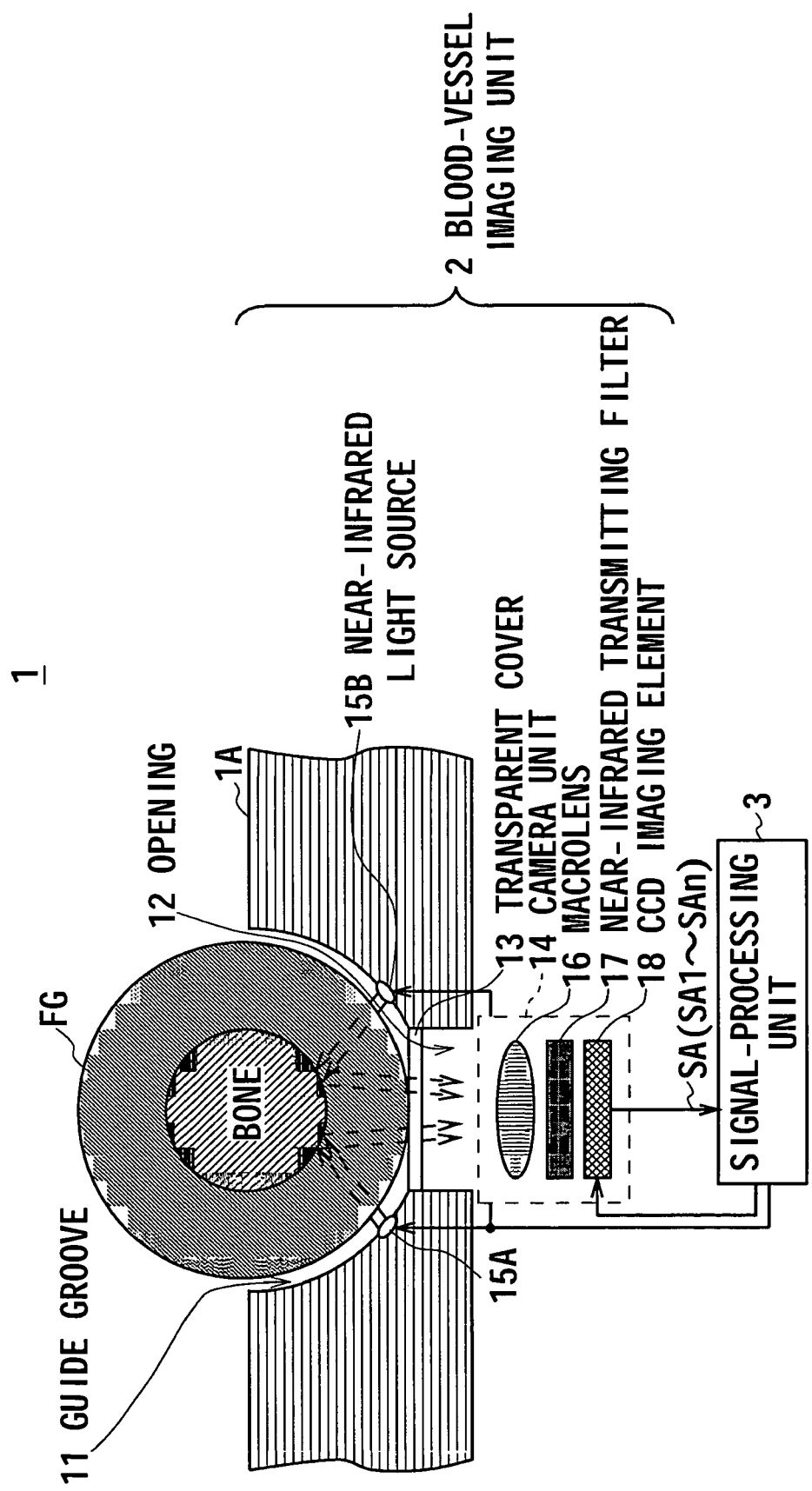
FIG. 1 is a diagram illustrating an authentication apparatus according to an embodiment of this invention.

FIG. 1 illustrates an authentication apparatus 1 according to an embodiment of this invention. The apparatus 1 includes a blood-vessel imaging unit 2 and a signal-processing unit 3, which are connected by a cable.

The blood-vessel imaging unit 2 has a guide groove 11 that is made in a specified part of the housing 1A of the apparatus 1. The guide groove 11A has a curved bottom. It has an opening 12 cut in the bottom.

A person, who wants to be authenticated, may first place his or her finger FG in the guide groove 11 and then move the finger FG until the fingertip touches the distal end of the guide groove 11. When the fingertip touches the distal end of the guide groove 11, the finger cushion is aligned with the opening 12.

A transparent cover 13 made of a specific material covers the opening 12. A camera unit 14 is provided in the housing 1A and positioned right below the opening 12.

A pair of near-infrared light sources 15A and 15B are provided on the bottom of the guide groove 11. They are located on the sides of the opening 12, spaced apart from each other in the widthwise direction of the guide groove 11. The light sources 15A and 15B emit near-infrared beams to illuminate the cushion of the finger FG placed in the guide groove 11. Note that the near-infrared beam can be uniquely absorbed by hemoglobin.

Hence, the near-infrared beams reflected from the finger FG is far less than in the case the beams are applied to the back of the finger FG. The near-infrared beams enter the finger FG from the cushion thereof. In the finger FG, a part of near-infrared beams is absorbed in part by the hemoglobin in the blood vessels, and another part of the beams are scattered in the tissues other than the blood vessels. The remaining part of the beam emerges from the finger FG, passes through the opening 12 and the transparent cover 13 and enters the camera unit 14. (Hereinafter, this part of the near-infrared beams will be referred to as blood-vessel projecting light.)

In the camera unit 14, a macrolens 16, a near-infrared transmitting filter 17 and a CCD imaging element 18 are arranged in optical alignment, in the order they are mentioned. The filter 17 allows the passage of only near-infrared light falling within a wavelength range (about 900 nm to 1000 nm), the intensity of which depends on both oxygenated hemoglobin and deoxygenated hemoglobin. The blood-vessel projecting light coming through the transparent cover 13 passes through the macrolens 16 and the near-infrared transmitting filter 17, reaching the imaging surface of the CCD imaging element 18. The camera unit 14 can therefore provide a faithful image of the capillary vessels in the finger FG, both the veins and the arteries.

Controlled by the signal-processing unit 3, the CCD imaging element 18 photographs the image of the blood vessels formed on its imaging surface. The CCD imaging element 18 generates image signals representing the image (hereinafter called blood-vessel image signal). The blood-vessel image signals SA1, SA2, . . . SAn are output to the signal-processing unit 3, one after another.

Figure 2:
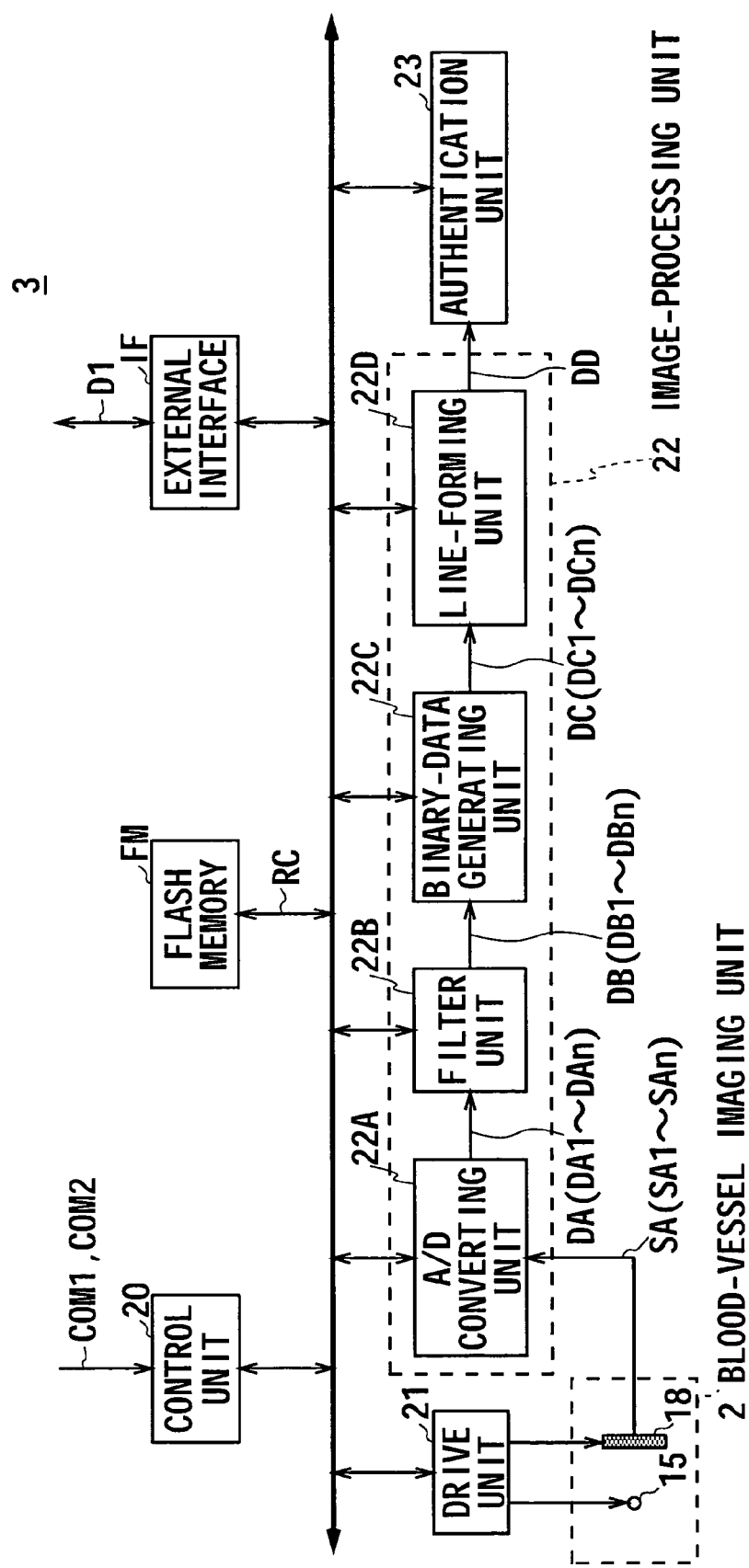
FIG. 2 is a block diagram showing the configuration of the signal-processing unit incorporated in the authentication apparatus.

As FIG. 2 shows, the signal-processing unit 3 includes a control unit 20, a drive unit 21, an image-processing unit 22, an authentication unit 23, a flash memory FM, and an interface IF (hereinafter called external interface). The drive unit 21, image-processing unit 22, authentication unit 23, flash memory FM, and external interface IF are connected to the control unit 20.

The control unit 20 is a computer that includes a central processing unit (CPU), a read only memory (ROM), and a random access memory (RAM). The CPU controls the entire authentication apparatus 1. The ROM stores various programs. The RAM severs as work memory for the CPU. The control unit 20 receives two commands COM1 and COM2 from the operation unit (not shown) provided on the housing 1A of the authentication apparatus 1, as the operation unit is operated. Command COM1 sets the apparatus 1 in an operating mode (hereinafter referred to as blood-vessel registering mode) in which the apparatus registers the image of the blood-vessels of a person who wants to have his or her identity registered. Command COM2 set the apparatus 1 in an operating mode (hereinafter referred to as authenticating mode) in which the apparatus 1 determines whether the identity of the person has been registered or not.

In response to command COM1 supplied from the operating unit (not shown), the control unit 20 executes a program stored in the ROM, setting the authentication apparatus 1 to the blood-vessel registering mode. Thus, the control unit 20 controls the drive unit 21, image-processing unit 22 and authentication unit 23.

In this case, the drive unit 21 drives the near-infrared light sources 15A and 15B and the CCD imaging element 18 of the camera unit 14, thus activating the blood-vessel imaging unit 2. As a result, the near-infrared light sources 15A and 15B emit near-infrared beams to the cushion of the finger FG placed in the guide groove 11 (FIG. 1). The blood-vessel projecting light is applied to the CCD imaging element 18. The element 18 generates blood-vessel image signals SA1, SA2, . . . SAn from the blood-vessel projecting light. These signals SA1, SA2, . . . SAn are output, one after another, to the analog-to-digital (A/D) converting unit 22A that is incorporated in the image-processing unit 22.

The A/D converting unit 22A performs A/D conversion on the blood-vessel image signals SA1, SA2, . . . SAn, generating image data items DA1, DA2, . . . DAn (hereinafter referred to as blood-vessel image data items). The blood-vessel image data items DA1, DA2, . . . DAn are sent to the filter unit 22B.

The filter unit 22B performs various filtering processes, such as noise removal and edge emphasis, on the blood-vessel image data items DA1, DA2, . . . DAn, generating blood-vessel image data items DB1, DB2, . . . DBn representing images of the blood vessels. The data items DB1, DB2, . . . DBn are supplied to the binary-data generating unit 22C.

The binary-data generating unit 22C performs binarization on the blood-vessel image data items DB1, DB2, . . . DBn, generating black-and-white image data items DC1, DC2, . . . DCn (hereinafter referred to as binary blood-vessel image data items). The binary blood-vessel image data items DC1, DC2, . . . DCn are sent to the line-forming unit 22D.

The line-forming unit 22D performs, for example, a morphology process on the binary blood-vessel image data items DC1, DC2, . . . DCn, transforming the blood-vessel image data items DC1, DC2, . . . DCn to data items that represent lines equivalent to the binary images of the blood vessels.

The line-forming unit 22D selects one of the binary blood-vessel images, each composed of the lines representing the blood vessels (hereinafter called blood-vessel lines). The unit 22D then supplies binary blood-vessel image data DD corresponds to the binary blood-vessel image selected, to the authentication unit 23.

The authentication unit 23 generates registration-authenticating information RC of a specific format, from the binary blood-vessel image data DD. The registration-authenticating information RC is sent to the control unit 20.

The control unit 20 thus controls the drive unit 21, image-processing unit 22 and authentication unit 23, receiving registration-authenticating information RC from the authentication unit 23. On receiving the information RC, the control unit 20 registers the information RC in the flash memory FM. At the same time, the control unit 20 stops controlling the drive unit 21, image-processing unit 22 and authentication unit 23. The blood-vessel imaging unit 2 therefore stops operating.

This is how the control unit 20 makes the apparatus 1 operate in the blood-vessel registering mode.

The control unit 20 may receive command COM2 from the operating unit (not shown). In this case, the control unit 20 executes another program stored in the ROM, setting the authentication apparatus 1 to the authentication mode. The control unit 20 controls the drive unit 21, image-processing unit 22 and authentication unit 23 and reads the registration-authenticating information RC from the flash memory FM. The information RC thus read is supplied to the authentication unit 23.

The drive unit 21 activates the blood-vessel imaging unit 2 in the same way as in the blood-vessel registering mode. The image-processing unit 22 performs various processes on the blood-vessel image signals SA (SA1, SA2, . . . SAn) sequentially output from the blood-vessel imaging unit 2, as in the blood-vessel registering mode, generating binary blood-vessel image data DD. The binary blood-vessel image data DD is sent to the authentication unit 23.

The authentication unit 23 correlates the binary blood-vessel image represented by the image data DD with the binary blood-vessel image represented by the registration-authenticating information RC read from the flash memory FM, in terms of pattern of blood-vessel lines.

From the similarity between the blood-vessel line patterns correlated, the authentication unit 23 determines whether the person who has his or her finger imaged by the blood-vessel imaging unit 2 has been registered or not, generating data D1. The data D1 is sent to the control unit 20.

The control unit 20 thus controls the drive unit 21, image-processing unit 22 and authentication unit 23 and receives the data D1 from the authentication unit 23. The control unit 20 transfers the data D1 to an external apparatus via the external interface IF. At the same time, the control unit 20 stops controlling the drive unit 21, image-processing unit 22 and authentication unit 23. The blood-vessel imaging unit 2 is therefore stopped.

This is how the control unit 20 works so that the authentication apparatus 1 may operate in the authentication mode.

The authentication apparatus 1 thus authenticates a living subject, i.e., a person, as it examines the blood vessels that exist within the person who has his or her finger scanned, and then determines whether this person has been registered or not. The authentication apparatus 1 authenticates a person by identifying him or her with the image of the living tissues within the subject, not with anything existing on the subject, such as fingerprints. Hence, any other person cannot have himself or herself identified as the registered person unless he or she has cut a finger from the registered person and place it in the guide groove 11.

(2) Processes Performed by the Filter Unit

The processes that the filter unit 22B carries out under the control of the control unit 20 will be explained.

Figure 3:
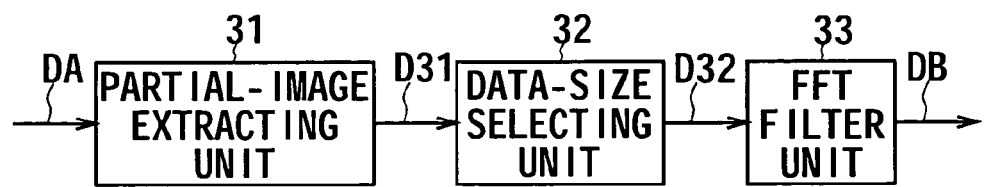
FIG. 3 is a block diagram explaining the process performed by the filter unit provided in the authentication apparatus.

As FIG. 3 shows, the filter unit 22B has three components 31, 32 and 33 that perform three functions, respectively. That is, the partial-image extracting unit 31 extracts a part of a blood-vessel image (hereinafter referred to as partial blood-vessel image). The data-size selecting unit 32 selects a data size that corresponds to the data-decomposing condition described in the algorithm realizing FFT, in accordance with the data size of the partial blood-vessel image extracted by the partial-image extracting unit 31. (The data size thus selected shall be called FFT-decomposable size.) The FFT filter unit 33 carries out a filtering process employing FFT, on the data representing the partial blood-vessel image of the data size selected. (Hereinafter, this filtering process shall be called FFT filtering.)

The processes that the partial-image extracting unit 31, data-size selecting unit 32 and FFT filter unit 33 perform, respectively, will be described in detail.

(2-1) Extraction of Partial Blood-Vessel Images

Figure 4A:
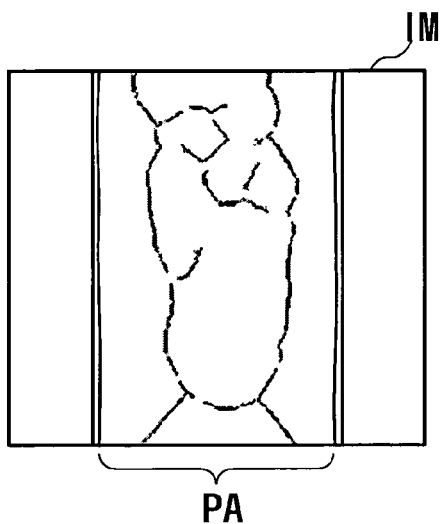
FIGS. 4A and 4B are diagrams showing a blood-vessel image IM and a partial blood-vessel image PIM extracted from the blood-vessel image IM.

The partial-image extracting unit 31 scans the blood-vessel image IM shown in FIG. 4A and detects a part PA that corresponds to the finger placed in the guide groove 11. The unit 31 then extracts this part PA (hereinafter referred to as finger part), as partial blood-vessel image PIM shown in FIG. 4B.

More specifically, the partial-image extracting unit 31 receives the blood-vessel image data DA (DA1, DA2, ... DAn) from the A/D converting unit 22A, retrieves a blood-vessel image IM from the data DA in a predetermined order and detects the luminance values of the pixels that constitute the blood-vessel image IM. On the basis of the luminance values detected, the partial-image extracting unit 31 recognizes the finger part PA of the blood-vessel image IM.

The partial-image extracting unit 31 extracts the partial blood-vessel image PIM the edges of which are boundaries of the finger part PA thus recognized. The unit 31 generates data representing the partial blood-vessel image PIM (hereinafter called partial blood-vessel image data). The partial blood-vessel image data D31 ($D31_1$ to $D31_n$) is sent to the data-size selecting unit 32.

Thus, the partial-image extracting unit 31 can reduce the size of the blood-vessel image IM in the widthwise direction thereof, in accordance with the thickness of the finger placed in the guide groove 11. Hence, the unit 31 can reduce the size No [pixel] of data representing the width of the blood-vessel image IM. (Hereinafter, this data size shall be referred to as widthwise data size.)

(2-2) Process of Selecting the Data Size

The data-size selecting unit 32 selects an FFT-decomposable size from several choices that are close to the widthwise data size No of the partial blood-vessel image PIM.

Two conditions for decomposing data, described in the algorithm for realizing the fast Fourier transform, are generally known. One is 2's power (for the Cooley-Tukey type FFT). The other is a product of prime numbers (for the Prime Factor type FFT). In the present embodiment, the data-size selecting unit 32 is designed to select an FFT-decomposable size such that the data can be decomposed into products of prime numbers. This is because, the unit 32 can select an FFT-decomposable size that is more similar to the widthwise data size No of the partial blood-vessel image PIM than in the case where the data is decomposed into 2's powers.

In effect, the data-size selecting unit 32 recognizes the widthwise data size No of the partial blood-vessel image PIM extracted from the partial blood-vessel image data D31 ($D31_1$ to $D31_n$) supplied from the partial-image extracting unit 31.

Figure 5:
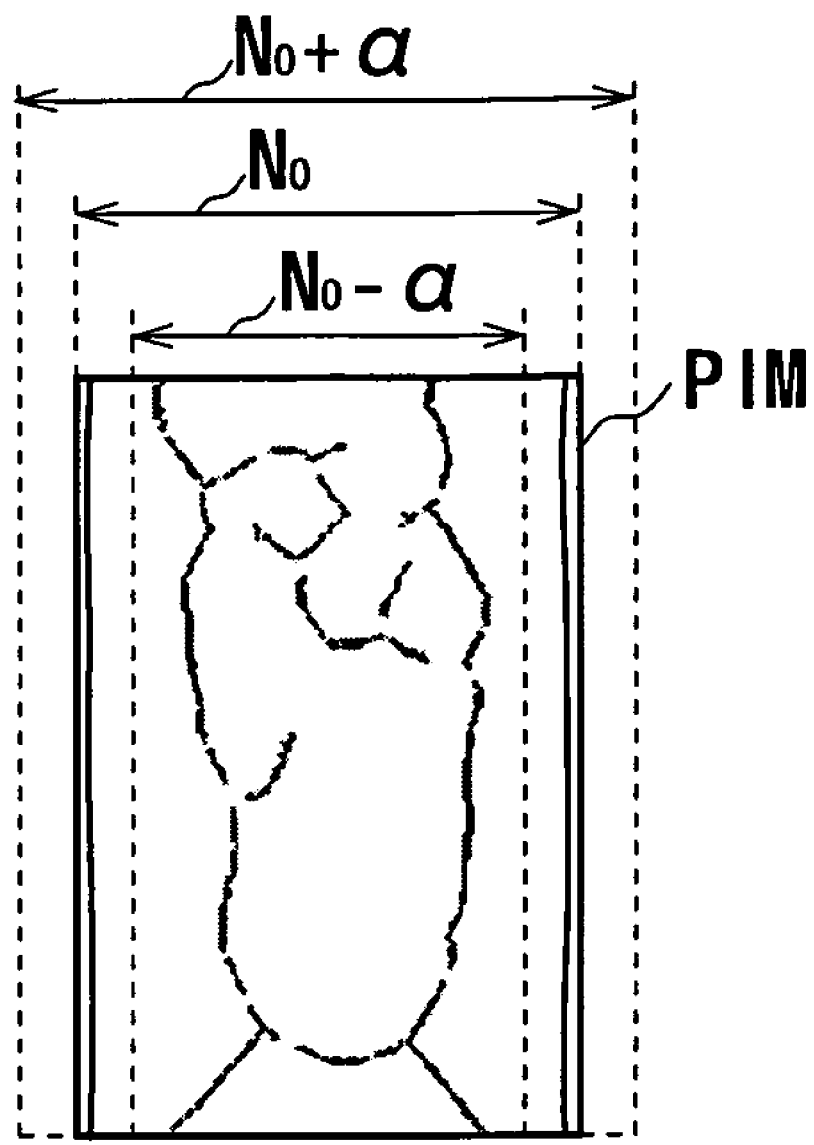
FIG. 5 is a diagram depicting a range of FFT-decomposable sizes that can be selected.

As shown in FIG. 5, the data-size selecting unit 32 sequentially detects FFT-decomposable sizes, ranging from No+α [pixel] to No−α [pixel] (where α=1, 2, ... or n), using the widthwise data size No as reference. Here, the data of any FFT-decomposable size can be decomposed into products of prime numbers that are smaller than a specific greatest prime number (hereinafter called the preset greatest prime number).

If the data-size selecting unit 32 does not detect the FFT-decomposable size equal to the widthwise data size No, the widthwise data size No cannot be factored into a product of prime numbers that are equal to or smaller than the maximum prime number. Hence, the data-size selecting unit 32 selects the FFT-decomposable size that is more similar to the widthwise data size No of the partial blood-vessel image PIM than any other FFT-decomposable sizes detected. Then, the unit 32 changes the widthwise data size No to the FFT-decomposable size it has just selected. The unit 32 generates partial blood-vessel image data D32 ($D32_1$ to $D32_n$) of this FFT-decomposable size. The partial blood-vessel image data D32 is supplied to the FFT filter unit 33.

In this case, the data-size selecting unit 32 maintains the partial blood-vessel image in a size that is similar to that of the finger part PA. The unit 32 can yet prevent a decrease in the efficiency of FFT that is subsequently carried out.

If the data-size selecting unit 32 detects the FFT-decomposable size equal to the widthwise data size No, the widthwise data size No can be factored into a product of prime numbers that are equal to or smaller than the preset greatest prime number. In this case, the data-size selecting unit 32 does not change partial blood-vessel image data D31 ($D31_1$ to $D31_n$) supplied from the partial-image extracting unit 31. The unit 32 supplies the partial blood-vessel image data D31, as partial blood-vessel image data D32, to the FFT filter unit 33.

The data-size selecting unit 32 can therefore select an FFT-decomposable size from the choices that are similar to the widthwise data size No of the partial blood-vessel image PIM.

In this embodiment, the greatest of the prime numbers that defines various FFT-decomposable sizes is one selected in accordance with the stability that the FFT-decomposable size selected has with respect to the time required to perform FFT on any data having the FFT-decomposable size selected.

Figure 6:
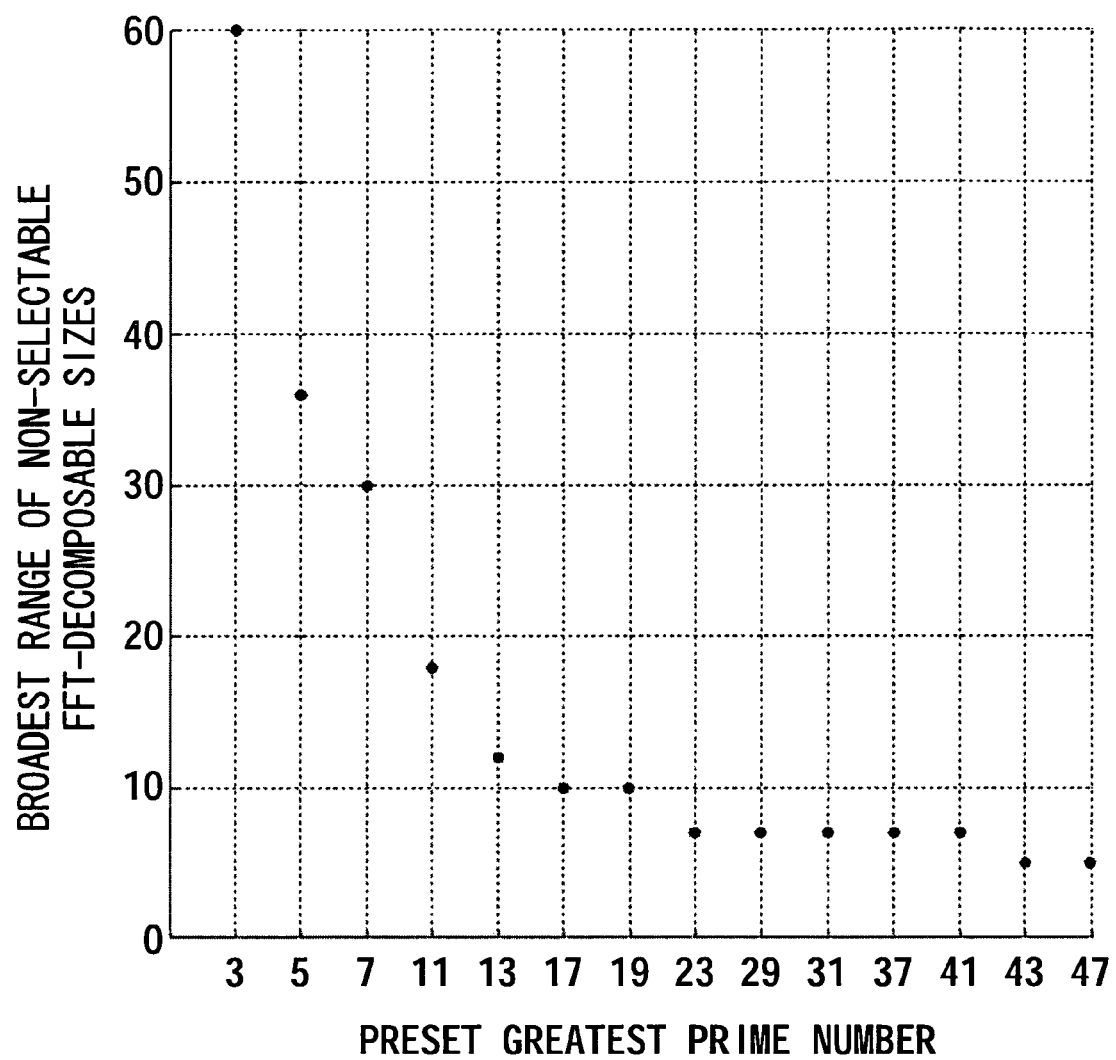
FIG. 6 is a graph representing the relation between the preset greatest prime number and the broadest range of FFT-decomposable sizes that cannot be selected.
Figure 7:
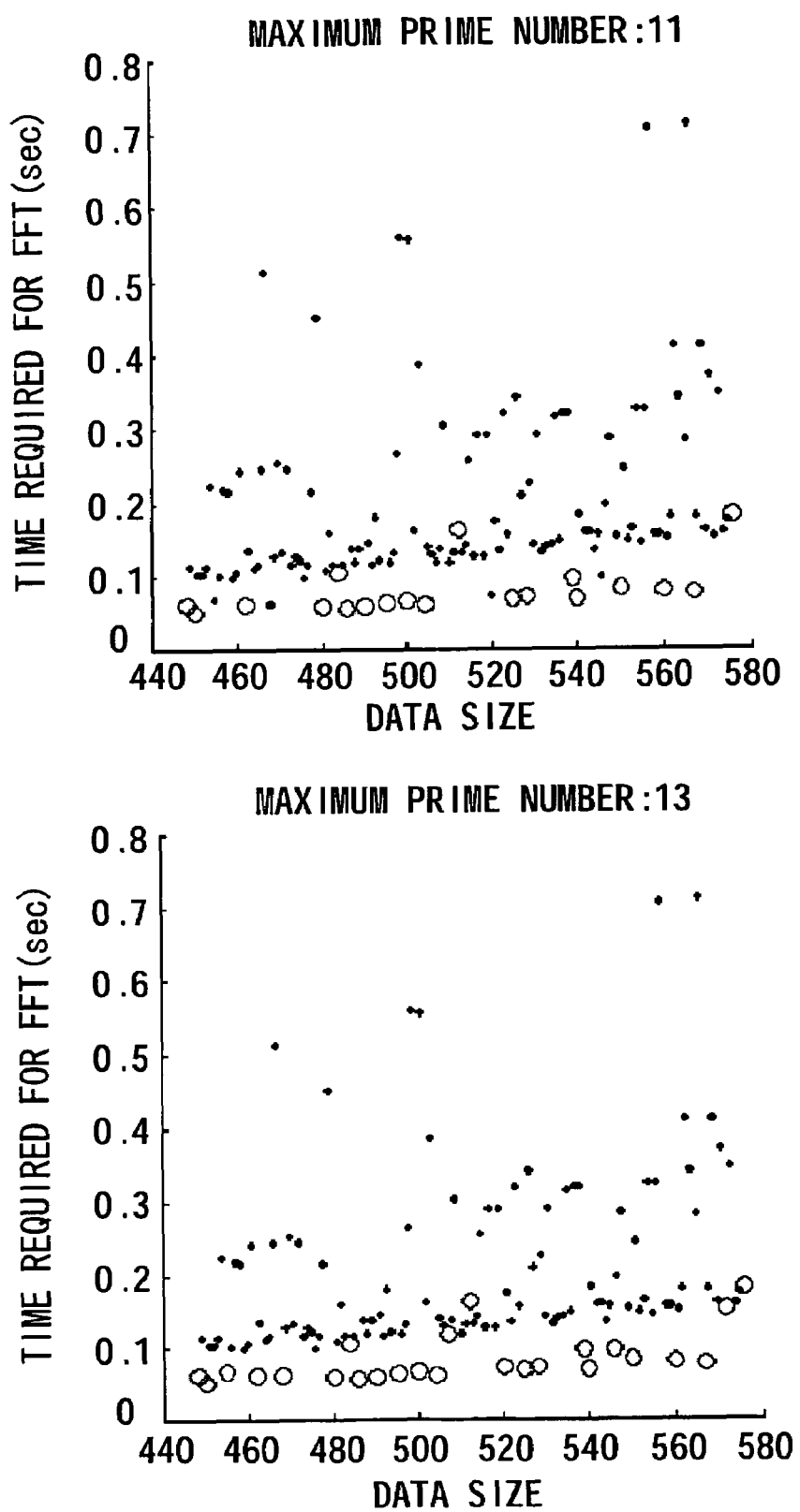
FIGS. 7 to 14 are graphs showing relations among the maximum number of elements, data size, and processing time required for FFT have.
Figure 8:
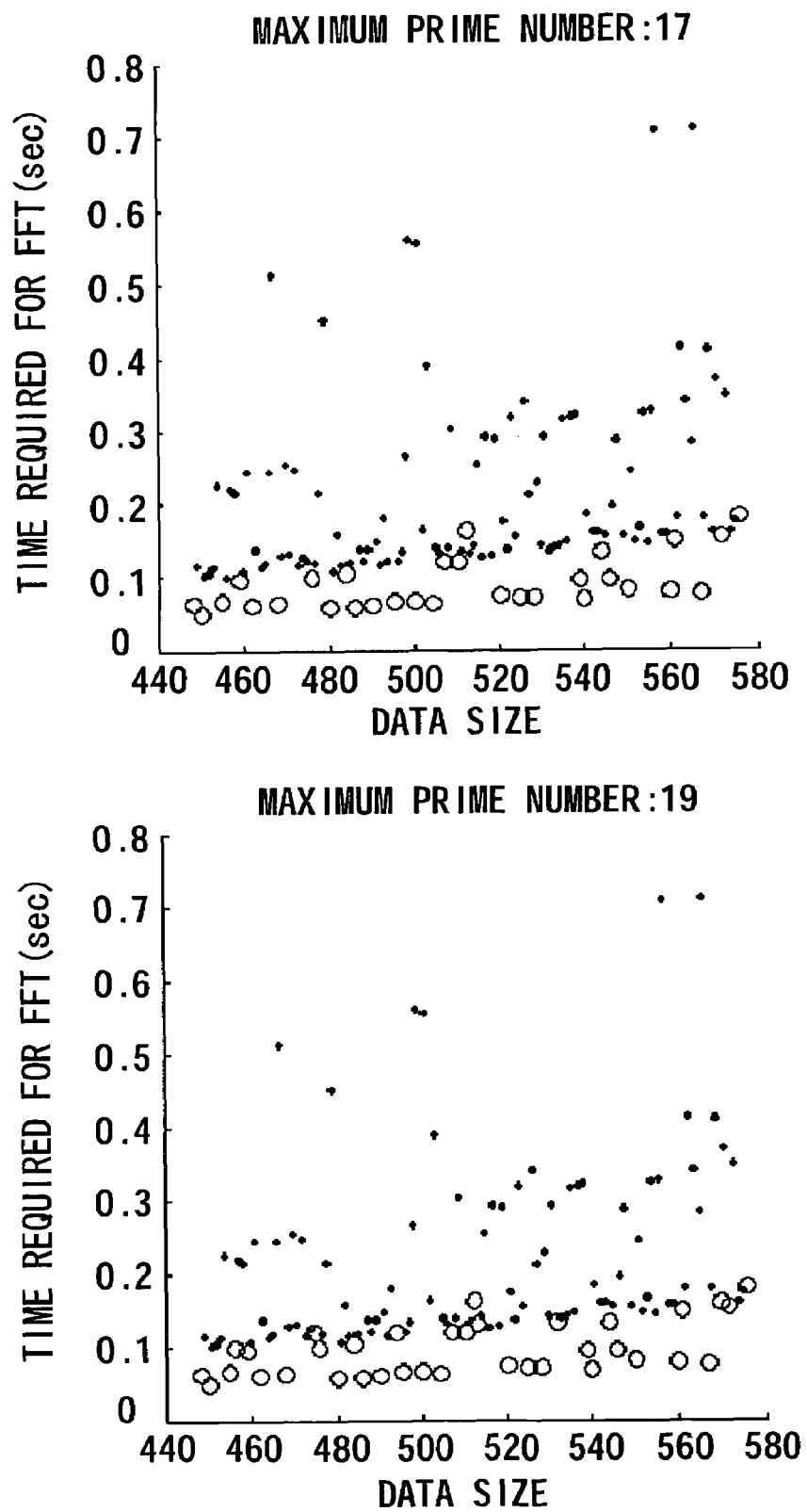
Figure 9:
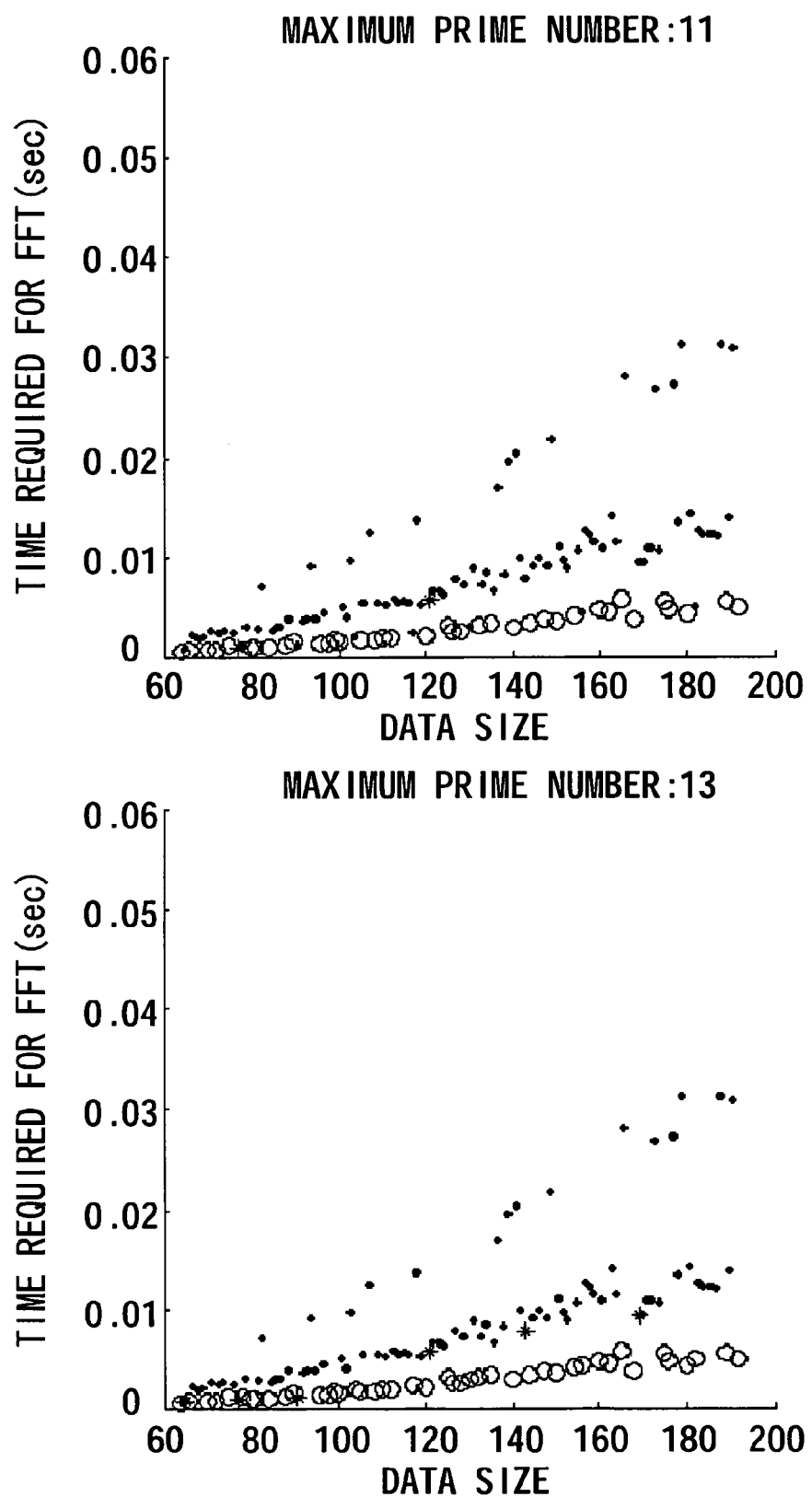
Figure 10:
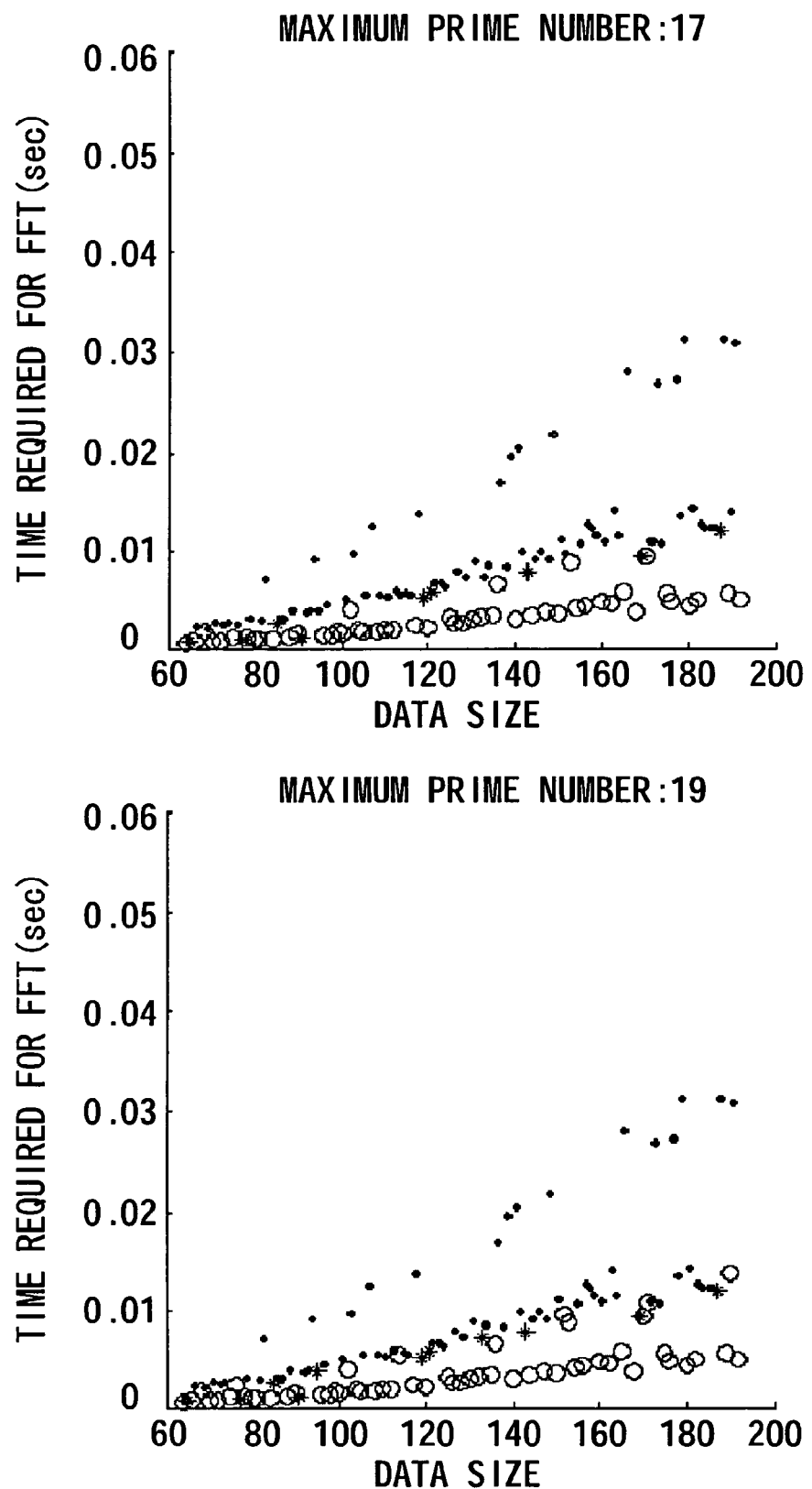
Figure 11:
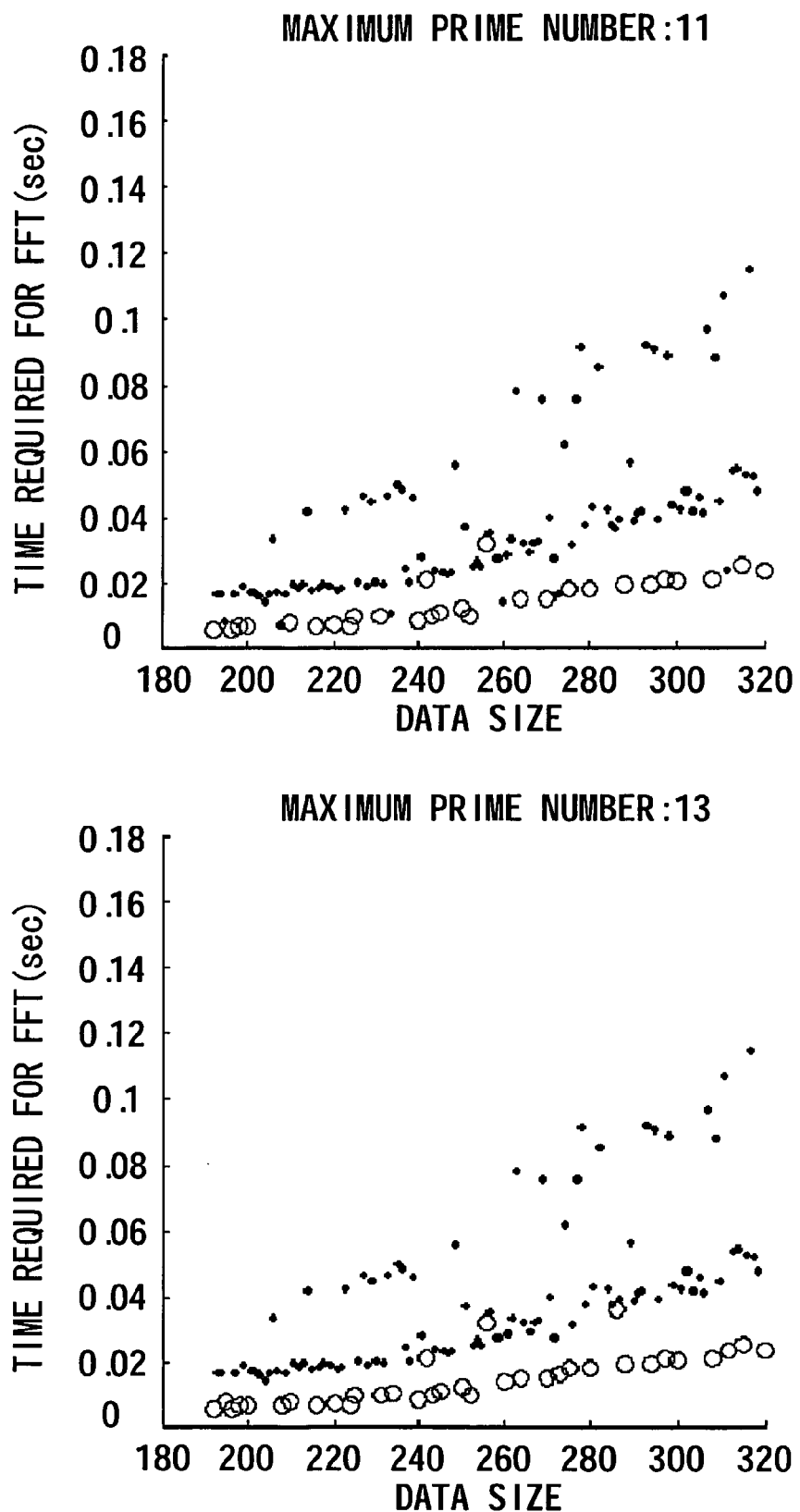
Figure 12:
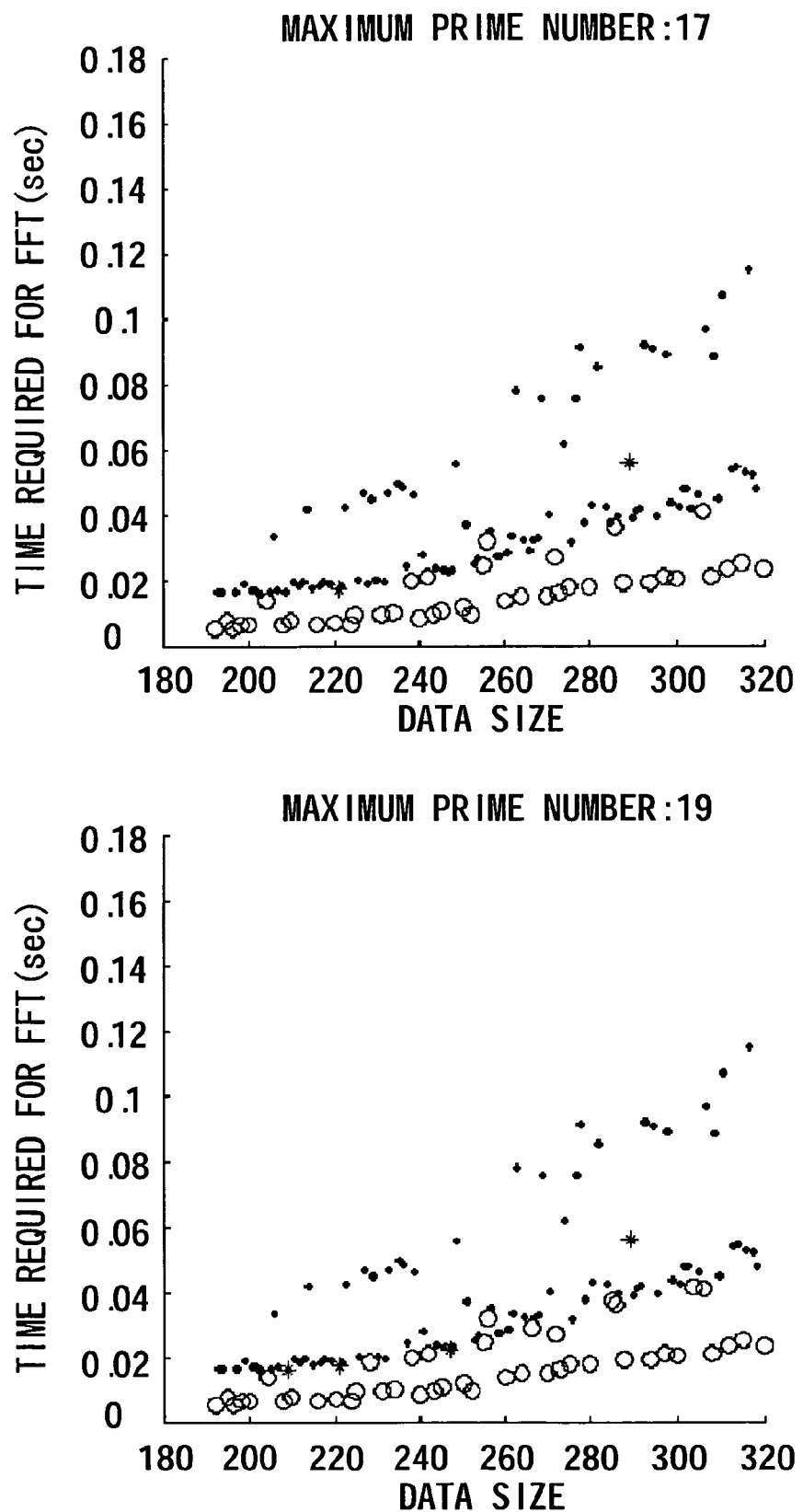
Figure 13:
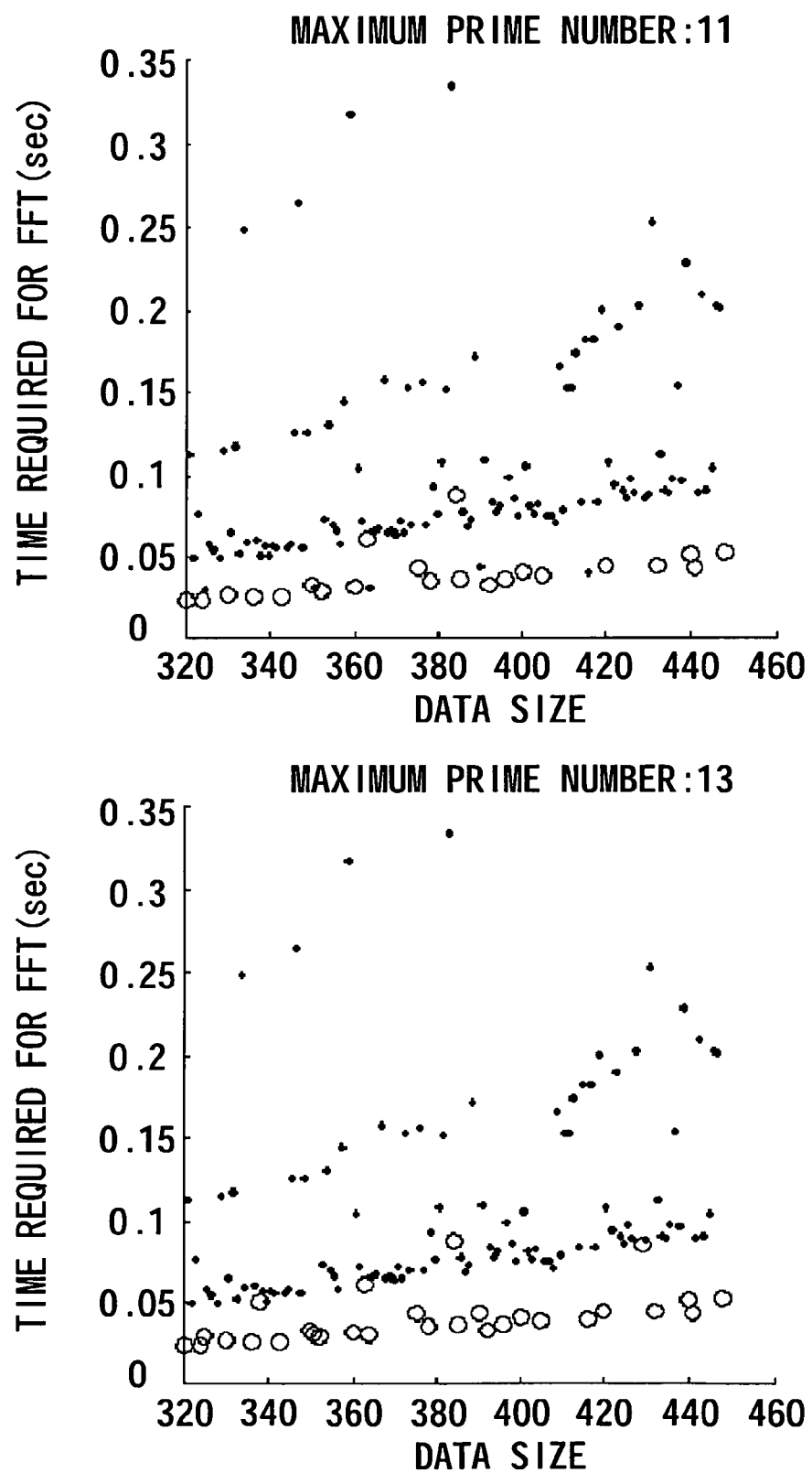
Figure 14:
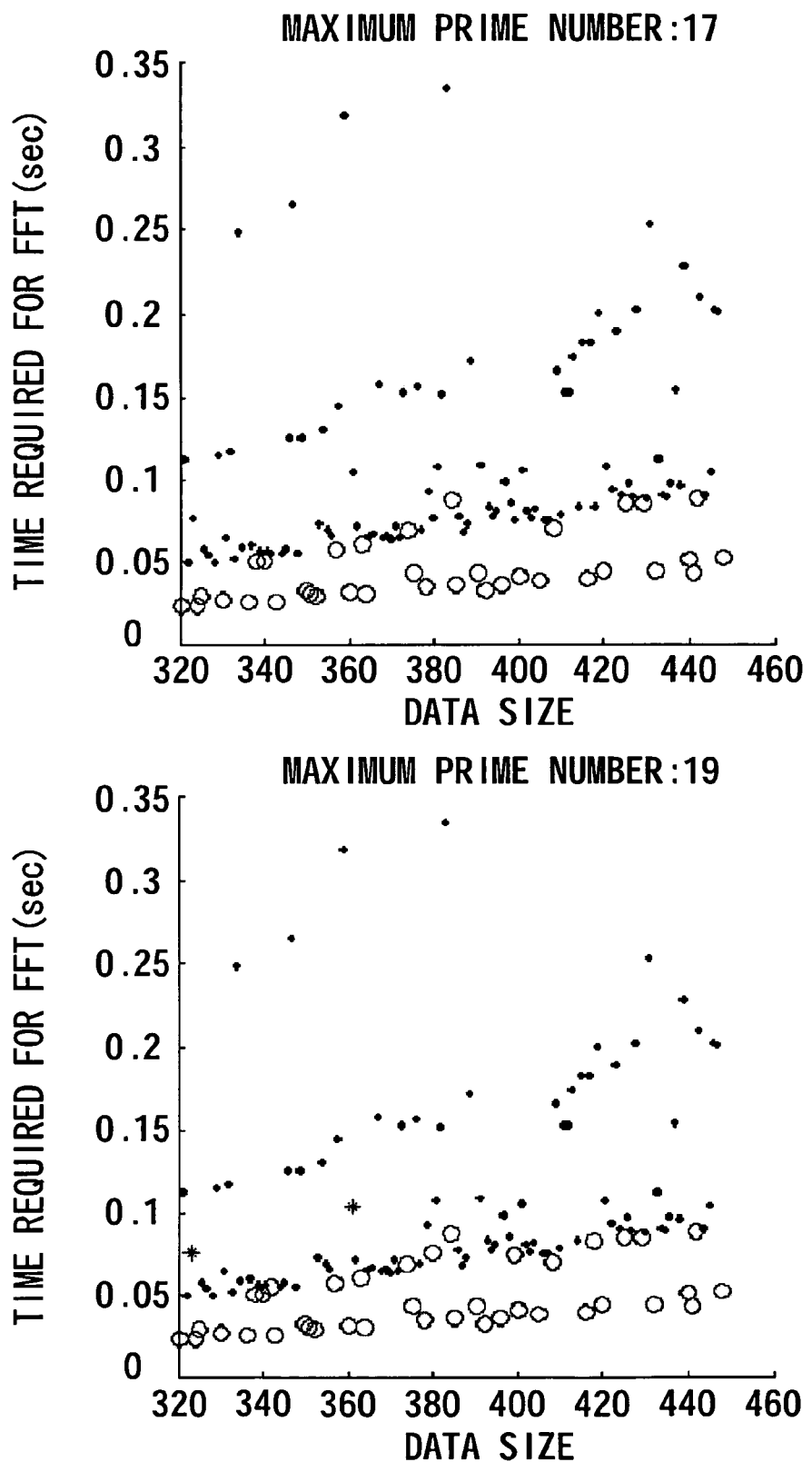

FIG. 6 represents the relation between the preset greatest prime number and the broadest range of FFT-decomposable sizes that cannot be selected (hereinafter called the broadest range of non-selectable FFT-decomposable sizes). The sizes that cannot be selected are among the FFT-decomposable sizes equal to or smaller than 512 [pixel] that is the product of prime numbers that are equal to or smaller than the preset greatest prime number.

As FIG. 6 shows, the broadest range of non-selectable FFT-decomposable sizes is "30" if the preset greatest prime number is "7". The relation between the preset greatest prime number "7" and the broadest range "30" will be explained in detail. There are two data sizes that are smaller than 512 [pixel] and can be uniquely factored into a product of prime numbers equal to or smaller than "7". They are "450" ($2 \times 3^2 \times 5^2$) and "480" ($2^5 \times 3 \times 5$). This means that no data sizes that can be expressed by a prime number equal to or smaller than "7" exist in the range between data size "450" and data size "480". Namely, the range of non-selectable FFT-decomposable sizes is broad. Hence, an FFT-decomposable size close to the widthwise data size No of the partial blood-vessel image PIM extracted can hardly be selected.

As seen from FIG. 6, too, the smaller the preset greatest prime number, the broader the broadest range of non-selectable FFT-decomposable sizes. In other words, the larger the preset greatest prime number, the narrower the broadest range of non-selectable FFT-decomposable sizes. Thus, once a prime number has been selected as the preset greatest prime number, the range of FFT-decomposable sizes, which is shown in FIG. 5, can be uniquely determined. (This range of FFT-decomposable sizes is the preset data size α.) If a prime number equal to or larger than "11" is selected as the preset greatest prime number, it is possible to select an FFT-decomposable size that is close to the widthwise data size No of the partial blood-vessel image PIM. If the preset greatest prime number is large, however, the time required for the subsequent FFT process will proportionally increase.

The inventors hereof calculated the time required for the FFT process, with respect to four prime numbers "11," "13," "17" and "19" that fall within the range from "10" to "20, over the "64"-ranges with middle data sizes of "128", "256", "384", and "512". The results were as shown in FIGS. 7 to 14.

In FIGS. 7 to 14, "O" is the time required to perform FFT for a data size that can be expressed by the preset greatest prime number; and "•" is the time required to perform FFT for a data size that cannot be expressed by the preset greatest prime number; and "*" is the time required to perform FFT for a data size that is defined by only the preset greatest prime number and the second preset greatest prime number. The data size defined by only the preset greatest prime number and the second preset greatest prime number is, for example, "11×13" or "13×13" if the preset greatest prime number is "13".

As evident from FIGS. 7 to 14, the time required to perform FFT falls within a limited range, no matter whichever prime number is selected as the greatest one. In other words, the FFT-process time is constant. Assume that "11" is selected as the preset greatest prime number, minimizing the FFT-process time. Even in this case, the broadest range of non-selectable FFT-decomposable sizes is "18", which differs by "9" only from the initial data size (i.e., the widthwise data size No of the partial blood-vessel image PIM extracted). Any data size that is equivalent to the FFT-process time "*" may not be selected. If this is the case, the broadest range of non-selectable FFT-decomposable sizes remains unchanged, which is more desirable.

Assume that the "19" is selected as the preset greatest prime number, maximizing the FFT-process time. In this case, no practical problems arise, though the FFT-process time may fall out of a certain range. The broadest range of non-selectable FFT-decomposable sizes is "10", which differs by "5" at most from the initial data size. In this case, too, the broadest range of non-selectable FFT-decomposable sizes remains unchanged even if any data size equivalent to the FFT-process time "*" is not selected, as in the case where the preset greatest prime number selected is "11".

As may be understood from FIGS. 6 to 14, prime numbers "11", "13", "17" and "19" that may be selected as greatest of the prime numbers that constitute an FFT-decomposable size have critical significance. If any one of these prime numbers is selected, an FFT-decomposable size closer to the widthwise data size No of the partial blood-vessel image PIM can be selected, while maintaining the stable FFT-process time.

(2-3) FFT-Filtering Process

The FFT filter unit 33 receives the partial blood-vessel image data D32 (D$32_1$ to D$32_n$) from the data-size selecting unit 32 and decomposes the image data D32 into a product of prime numbers.

The FFT filter unit 33 performs Fourier transform, thus effecting convolution on the product of prime numbers. More precisely, the FFT filter unit 33 performs various filtering processes, such as the Laplacian edge extraction, generating blood-vessel image data DB (DB1, DB2, ... DBn). The image data DB is supplied to the binary-data generating unit 22C.

The FFT filter unit 33 is configured to perform FFT filtering at high speed. Thus, it can perform the FFT filtering process on the partial blood-vessel image data D32 that can be decomposed into a product of prime numbers.

(3) Processes Performed by the Filter Unit

Figure 15:
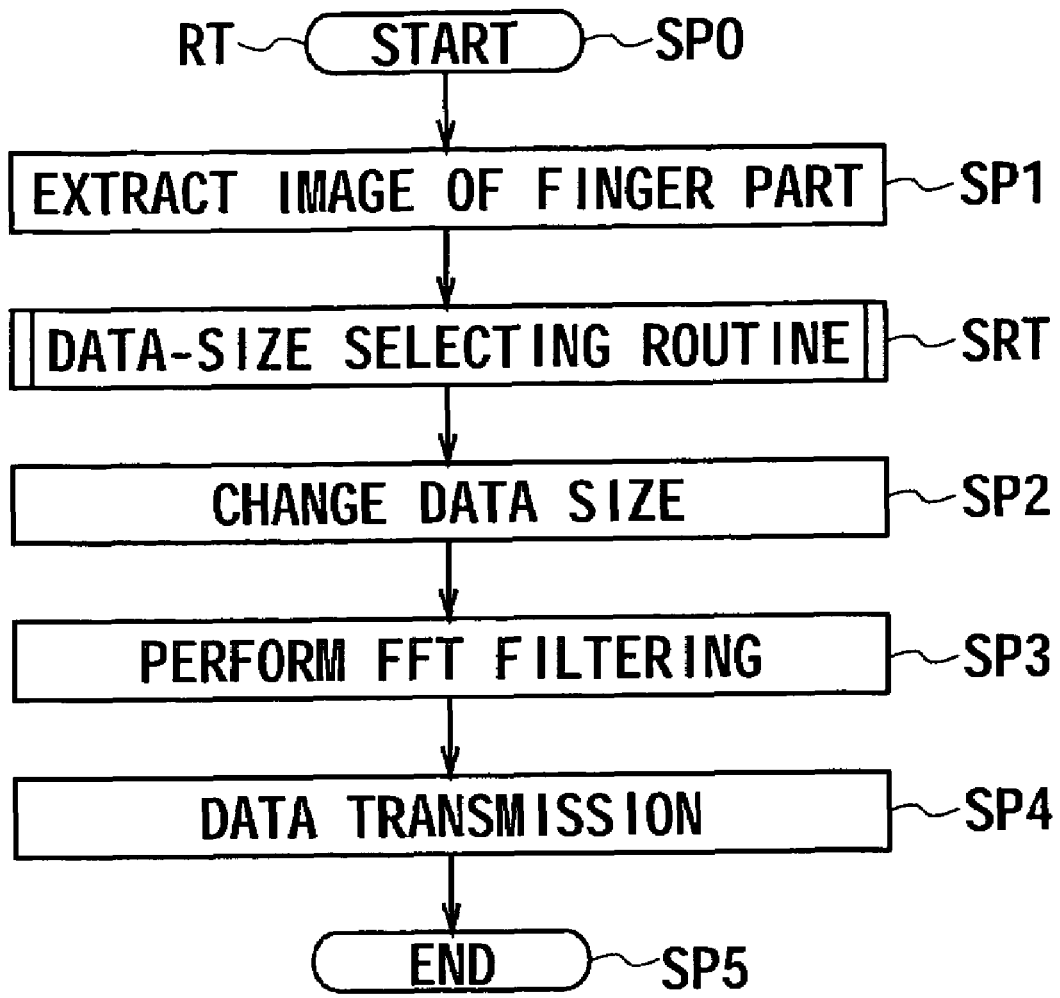
FIG. 15 is a flowchart explaining the sequence of filtering data.

The filter unit 22B performs various processes, or a sequence of filtering steps illustrated in FIG. 15.

Figure 4B:
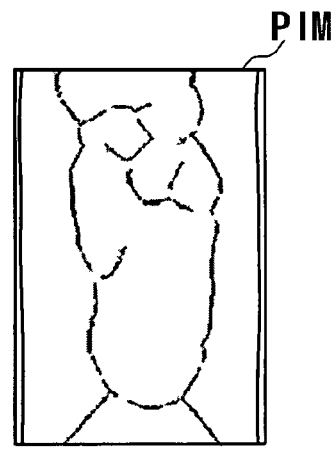

First, the filter unit 22B receives the blood-vessel image data DA1 from the A/D converting unit 22A. On receiving the data DA1, the filter unit 22B starts the filtering sequence RT in Step SP0. In Step SP1, the unit 22B extracts the finger part PA from the blood-vessel image IM (FIG. 4A) represented by the image data DA1. The finger part PA thus extracted is the partial blood-vessel image PIM (FIG. 4B).

Figure 16:
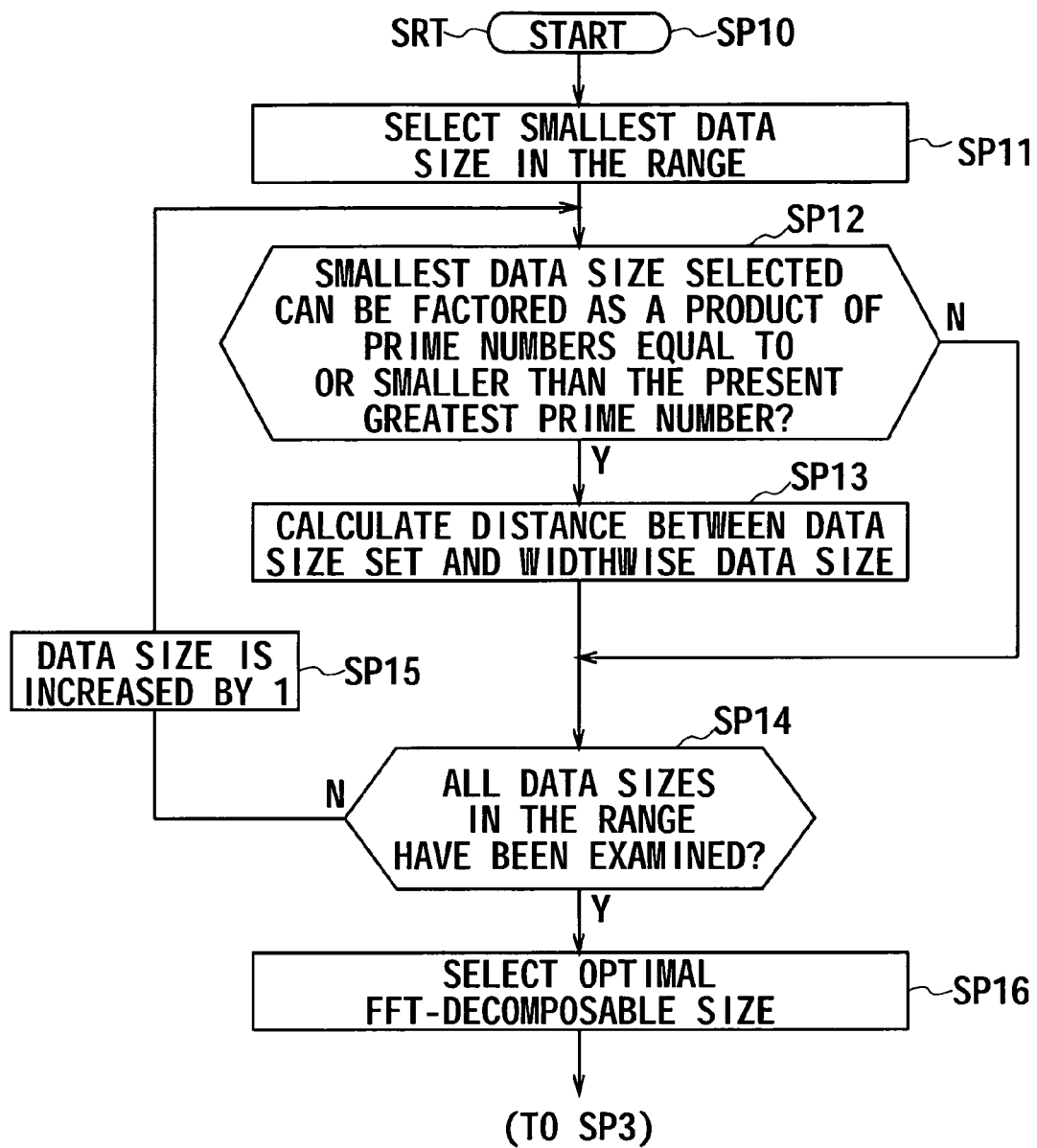
FIG. 16 is a flowchart explaining the sequence of selecting a data size.

In Step SP10, the filter unit 22B starts a data-size selecting routine SRT shown in FIG. 16. In Step SP11, the filter unit 22B selects the smallest data size (i=−α) in the range $N_i$ (i=−α, ... −1, 0, 1, ... α) based on the widthwise data size No of the partial blood-vessel image PIM extracted in Step SP1. In Step SP12, it is determined whether the smallest data size selected can be uniquely factored as a product of prime numbers equal to or smaller than the preset greatest prime number.

If the smallest data size selected is uniquely factored as a product of prime numbers equal to or smaller than the preset greatest prime number, the filter unit 22B calculates the difference (distance) between the data size set as reference (i.e., FFT-decomposable size) and the widthwise data size No. A memory provided in the filter unit 22B temporarily stores the difference in association with the FFT-decomposable data size. In Step SP14, it is determined whether all data sizes in the range $N_i$ (i=−α, ... −1, 0, 1, ... α) have been examined. If not all data sizes have been examined, each data size is increased by 1 (i=i+1) in Step SP15. The process then returns to Step SP12. Steps SP12 to SP13 are repeated.

If the smallest data size selected cannot be uniquely factored as a product of prime numbers equal to or smaller than the preset greatest prime number, and if it is determined in Step SP14 that all data sizes in the range $N_i$ (i=-α, . . . -1, 0, 1, . . . α) have not been examined, each data size is increased by 1 (i=i+1) in Step SP15, and the process returns to Step SP12. Therefore, Steps SP12 to SP13 are repeated.

Thus, the filter unit 22B detects FFT-decomposable sizes, one after another, each of which can be decomposed into a product of prime numbers equal to or smaller than the preset greatest prime number, which falls within the range $N_i$ (No+α [pixel] to No−α [pixel], FIG. 5) that is based on the widthwise data size No.

In Step SP14, it may be determined that all data sizes in the range $N_i$ (i=-α, . . . -1, 0, 1, . . . α) have been examined. In this case, the filter unit 22B selects the FFT-decomposable size that is identical or more similar to the widthwise data size No of the partial blood-vessel image PIM recognized in Step SP2. The filter unit 22B performs this selection in accordance with the FFT-decomposable size and the distance, both stored in Step SP13 in the memory provided in the filter unit 223.

The filter unit 22B goes from the data-size selecting routine SRT to Step SP2 (FIG. 15). In Step SP2, the filter unit 22B changes the widthwise data size No of the partial blood-vessel image PIM, extracted in Step SP1, to the FFT-decomposable size selected in the data-size selecting routine SRT. In Step SP3, the filter unit 22B performs FFT filtering on the partial blood-vessel image data D32 that has the FFT-decomposable size.

The filter unit 22B then goes to Step SP4, in which the image data DB generated through the FFT filtering process is supplied to the binary-data generating unit 22C. Thereafter, the filter unit 22B goes to Step SP5. In Step SP5, the unit 22B finishes the filtering sequence RT.

The filter unit 22B can perform the filtering process as described above.

(4) Operation and Advantage

The authentication apparatus 1 configured as described above extracts the finger part PA, as partial blood-vessel image data D31, from the blood-vessel image data DA acquired by photographing the blood vessels in the finger.

The authentication apparatus 1 then selects one of the data sizes in the range (No+α [pixel] to No−α [pixel]) in accordance with the conditions for decomposing data, which are described in the algorithm for realizing the fast Fourier transform. Note that "No" in the range (No+α [pixel] to No−α [pixel]) is the widthwise data size of the partial blood-vessel image PIM represented by the partial blood-vessel image data D31. The partial blood-vessel image data D32 that has the FFT-decomposable size selected is decomposed in accordance with the data-decomposing conditions, into data items. Then, the Fourier transform is carried out, accomplishing convolution of the data items.

In the authentication apparatus 1, even if the partial blood-vessel image data D31 having a size not satisfying data-decomposing conditions is extracted, any FFT-decomposable size that satisfies the data-decomposing conditions is automatically selected from the data sizes similar to that of the partial blood-vessel image data D31 extracted. This can prevent a decrease in the efficiency of convolution, maintaining the data size at a value similar to the initial widthwise data size, regardless of the data size of the partial blood-vessel image data D31.

The authentication apparatus 1 selects, as a data-decomposing condition, an FFT-decomposable size that can be decomposed into products of prime numbers equal to or smaller than the preset greatest prime number. Hence, the apparatus 1 can select an FFT-decomposable size close to the widthwise data size No of the partial blood-vessel image PIM extracted, at higher probability than in selecting a data size that can be decomposed into 2's powers. Thus, the efficiency of convolution can more reliably be prevented from decreasing, while maintaining the data size at a value similar to the initial widthwise data size No.

In the authentication apparatus 1, the flash memory FM stores the results of the convolution, which can be referred to. The storage capacity of the flash memory FM can be saved by a value for the data representing the finger part PA. In addition, the amount of data to be processed can be reduced by the data representing the finger part PA.

In the authentication apparatus 1 so configured as described above, the partial blood-vessel image data D31 pertaining to the finger part PA is extracted from the blood-vessel image data DA acquired by photographing the blood vessels in the finger. A data size is selected from those in a range, in accordance with the data-decomposing condition described in the algorithm realizing the fast Fourier transform. Note that the reference value for this range is the reference value of which is the widthwise data size No of the partial blood-vessel image PIM represented by the partial blood-vessel image data D31. The partial blood-vessel image data D32 that has the data size selected is decomposed in accordance with the data-decomposing conditions, into data items. The Fourier transform is then performed on these data items, accomplishing convolution thereof. The efficiency of convolution can therefore be prevented from decreasing, while maintaining the data size at a value similar to the initial widthwise data size No. As a result, the efficiency of processes can be all prevented from decreasing.

(5) Other Embodiments

In the embodiment described above, a part of the real data input, which is extracted, is the data representing the image (FIG. 4A) of the finger part PA. Nonetheless, the present invention is not limited to this. A part of the image data, which represents an image showing the blood vessels not so well due to changes in the intensity of light applied to the finger at the time of photographing, may be detected on the basis of the luminance value of the finger part PA. Then, the remaining part of the image data representing the finger part PA may be extracted. In this case, an image can be correlated with a registered one at high accuracy, to accomplish authentication.

The object that is analyzed to authenticate a living subject is the blood vessels in one finger of the subject. Nevertheless, this invention can be applied to anything existing on the subject, such as fingerprints, to the texture pattern of paper, to the nerves in the living subject, or to anything else, that can identify the subject. If the nerves are analyzed to authenticate the subject, a specific marker is injected into the subject, intensifying the image of the nerves. Then, the nerves are well photographed, and the image acquired can be analyzed to authenticate the subject, as in the embodiment described above.

The image data may be replaced by audio data to be analyzed or by a part of audio data, which is to be synthesized with other signals. This invention can be applied to the case where part of real data is extracted.

In the embodiment described above, a data size that can be decomposed into products of prime numbers equal to or smaller than the preset greatest prime number is selected from those in a specific range, in accordance with the conditions for decomposing data, which are described in the algorithm for realizing fast Fourier transform. The present invention is not limited to this, nonetheless. A data size that can be decomposed into 2's powers may be selected, instead of a data size that can be decomposed into products of prime numbers equal to or smaller than the preset greatest prime number.

Two data sizes that can be decomposed into products of prime numbers equal to or smaller than the preset greatest prime number and into 2's powers, respectively, may be detected, and one of these data sizes, which is more similar to the reference value (i.e., widthwise data size No) may be selected. Then, the efficiency of convolution can be more reliably prevented from decreasing, while maintaining the data size at a value similar to the initial widthwise data size No.

More specifically, the reference size (widthwise data size No) or a data size more similar to the reference size than any other data sizes is selected. Data sizes, which can be decomposed into 2's powers if the data size most similar to the reference size is selected, are then detected. These data sizes include any size that is more similar to the reference size than those that can be decomposed into products of prime numbers equal to or smaller than the preset greatest prime number. In this case, one of the data sizes that can be decomposed into 2's powers is selected, instead of a data size that can be decomposed into products of prime numbers equal to or smaller than the preset greatest prime number. Then, the efficiency of convolution can be prevented from decreasing, while suppressing the amount of data processed to select the data size, as much as possible.

In the embodiment described above, the data that should be extracted is decomposed in accordance with data-decomposing conditions, into data items. The data items thus acquired are subjected to the convolution achieved by Fourier transform. In order to accomplish the convolution, a filtering process such as edge extraction known as Laplacian edge extraction is executed. The present invention is not limited to this. The operation may be replaced by any other digital-signal process that can employ convolution achieved by Fourier transform. Among such digital-signal processes are: frequency-component analysis that determines data components; waveform synthesis that synthesizes given components of specific data; and correlation that determines which parts of a signal is similar to any other signal. These digital-signal processes can achieve the same advantage as the embodiment described above.

In the embodiment described above, an FFT-decomposable size is calculated for each blood-vessel image data DA input, on the basis of the widthwise data size No of the blood-vessel image data DA. An optimal FFT-decomposable size is selected in accordance with the FFT-decomposable size calculated. The present invention is not limited to this. Various data sizes to be referred to (hereinafter called reference data sizes) and data sizes similar to the reference data sizes may be stored in the form of a table, and an optimal FFT-decomposable size may be selected from the table. In this case, unique factoring need not be carried out, decreasing the amount of data that should be processed.

The present invention can be applied to the digital-signal processes, such as frequency-component analysis that determines data components, waveform synthesis that synthesizes given components of specific data, and correlation that determines which parts of a signal is similar to any other signal.

It should be understood by those skilled in the art that various modifications, combinations, sub-combinations and alternations may occur depending on design requirements and other factors insofar as they are within the scope of the appended claims or the equivalents thereof.

What is claimed is:

1. A digital-signal processing apparatus for processing image data comprising:
   a partial-image extracting unit that extracts partial image data from real image data input, said partial image data having a partial image data size;
   a data-size selecting unit that
   (a) selects a fast Fourier transform (FFT) decomposable data size from a plurality of candidate data sizes, each of said candidate data sizes falling in a range close to the partial image data size, said FFT decomposable data size complying with a data-decomposing condition, and
   (b) outputs selected data from the partial image data, said selected data having the selected FFT decomposable data size; and
   an FFT filter unit for decomposing the selected data into data items and for performing Fourier transform on each data item, thereby effecting convolution on the data item, wherein
   the data-decomposing condition comprises at least one of
   (a) the FFT decomposable data size can be decomposed into products of prime numbers eciual to or smaller than a preset prime number; and (b) can be decomposed into 2's powers.

2. The digital-signal processing apparatus according to claim 1, wherein the preset prime number is an optimal one obtained in accordance with stability that the data size selected in the range has with respect to time required to perform the fast Fourier transform on any data of the size selected.

3. A digital-signal processing method comprising:
   a first step of extracting, with a partial-image extracting unit, partial image data from real image data input, said partial image data having a partial image data size;
   a second step of selecting, with a data-size selecting unit, a fast Fourier transform (FFT) decomposable data size from a plurality of candidate data sizes, each of said candidate data sizes falling in a range close to the partial image data size, said FFT decomposable data size complying with a data-decomposing condition; and
   a third step of decomposing, with a FFT filter unit, selected data into data items, said selected data being selected from the partial image data and having the selected FFT decomposable data size, and for performing the Fourier transform on each data item, thereby effecting convolution on the data item, wherein
   the data-decomposing condition comprises at least one of
   (a) the FFT decomposable data size can be decomposed into products of prime numbers equal to or smaller than a preset prime number; and (b) can be decomposed into 2's powers.

4. The digital-signal processing method according to claim 3, wherein the preset prime number is an optimal one obtained in accordance with stability that the data size selected in the range has with respect to time required to perform fast Fourier transform on any data of the size selected.

5. A computer-readable medium containing instructions that cause a program in a data processing system for causing a control apparatus to perform a method, the method comprising the steps of:
   a first step of extracting partial image data from real image data input, said partial image data having a partial image data size;
   a second step of selecting fast Fourier transform (FFT) decomposable data size from a plurality of candidate data sizes, each of said candidate data sizes falling in a range close to the partial image data size, said FFT decomposable data size complying with a data-decomposing condition, and; and a third step of decomposing selected data into data items, said selected data being selected from the partial image data and having the selected FFT decomposable data size, and for performing the Fourier transform on each data item, thereby effecting convolution on the data item, wherein, the data-decomposing condition comprises at least one of (a) the FFT decomposable data size can be decomposed into products of prime numbers equal to or smaller than a preset prime number; and (b) can be decomposed into 2's powers.

6. The computer-readable medium containing instructions that cause a program according to claim 5, wherein the preset prime number is an optimal one obtained in accordance with stability that the data size selected in the range has with respect to time required to perform fast Fourier transform on any data of the size selected.

7. An authentication apparatus comprising:

a partial-image extracting unit that extracts partial image data from image data acquired by photographing a living subject, which represents an image with which the living subject is identified to be authenticated;

a data-size selecting unit that
  a) selects a fast Fourier transform (FFT) decomposable data size from a plurality of candidate data sizes, each of said candidate data sizes falling in a range close to the partial image data size, said FFT decomposable data size complying with a data-decomposing condition, and
  (b) outputs selected data from the partial image data, said selected data having the selected FFT decomposable data size;

an FFT filter unit for decomposing the selected into data items and for performing the Fourier transform on each data item, thereby effecting convolution on the data item; and a correlation means unit for correlating a result of the convolution with a data item, wherein the data-decomposing condition comprises at least one of (a) the FFT decomposable data size can be decomposed into products of prime numbers equal to or smaller than a preset prime number; and (b) can be decomposed into 2's powers.

8. The authentication apparatus according to claim 7, wherein the preset prime number is an optimal one obtained in accordance with stability that the data size selected in the range has with respect to time required to perform fast Fourier transform on any data of the size selected.

* * * * *